(12) United States Patent
Maguire et al.

(10) Patent No.: US 8,104,317 B2
(45) Date of Patent: Jan. 31, 2012

(54) COMPACT OIL TRANSFER MANIFOLD

(75) Inventors: Joel M. Maguire, Northville, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/826,755

(22) Filed: Jun. 30, 2010

(65) Prior Publication Data

US 2010/0263426 A1 Oct. 21, 2010

Related U.S. Application Data

(62) Division of application No. 11/233,849, filed on Sep. 23, 2005, now abandoned.

(51) Int. Cl.
*B21C 23/00* (2006.01)
*B21C 25/04* (2006.01)
*B23P 17/00* (2006.01)

(52) U.S. Cl. .................. 72/253.1; 72/269; 29/890.052; 29/890.08

(58) Field of Classification Search .............. 72/253.1, 72/254, 261, 264, 368, 269; 29/890.08, 890.052, 29/890.036
See application file for complete search history.

(56) References Cited

U.S. PATENT DOCUMENTS

| 4,906,496 | A | * | 3/1990 | Hosono et al. ............. 428/36.9 |
| 6,171,207 | B1 | | 1/2001 | Ehrlich et al. |
| 6,843,745 | B2 | | 1/2005 | Fritschle |
| 7,150,100 | B2 | * | 12/2006 | Tase et al. ............... 29/890.036 |
| 2004/0194312 | A1 | * | 10/2004 | Gowan et al. .......... 29/890.052 |
| 2006/0191746 | A1 | | 8/2006 | Diosi et al. |

FOREIGN PATENT DOCUMENTS

| DE | 436 928 A | 11/1926 |
| DE | 1 209 394 A | 1/1966 |
| DE | 37 43 195 C1 | 2/1989 |
| DE | 4118929 A1 | 10/1991 |
| DE | 199 34 405 A1 | 2/2001 |
| FR | 2 831 632 A1 | 5/2003 |

\* cited by examiner

*Primary Examiner* — Teresa Ekiert
(74) *Attorney, Agent, or Firm* — Quinn Law Group, PLLC

(57) ABSTRACT

The present invention relates to a manifold for a vehicle transmission. The manifold defines a plurality of laterally extending channels suitable for simultaneously transferring oil at separate flow rates and pressure signals and may be subdivided to provide a plurality of like defined manifolds. The manifold, formed through an extrusion process, is fittable within or around a transmission shaft.

8 Claims, 2 Drawing Sheets

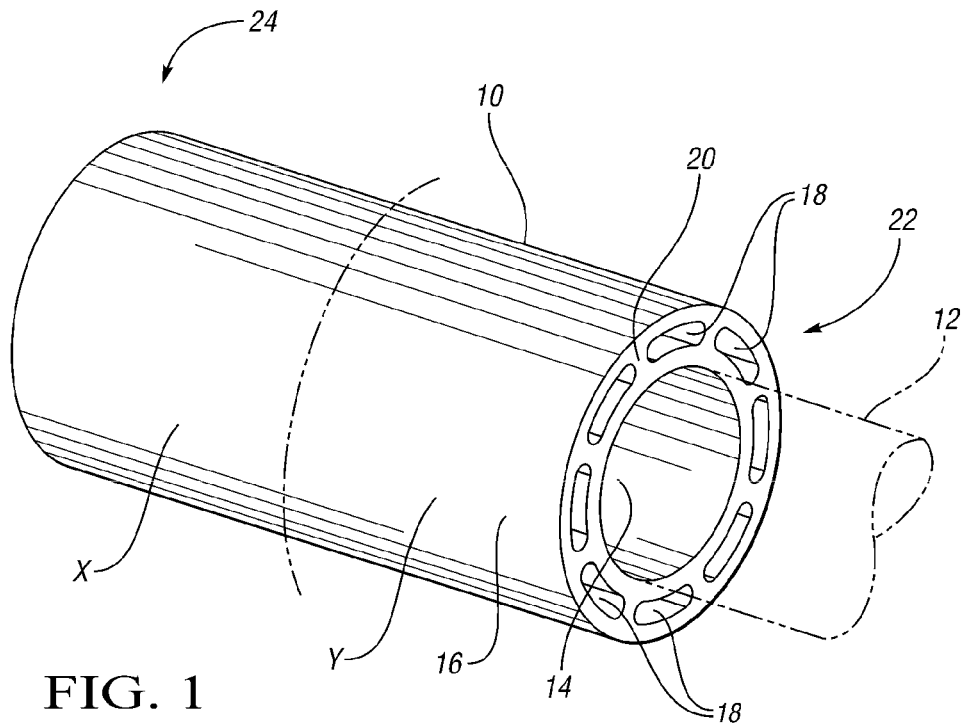
FIG. 1
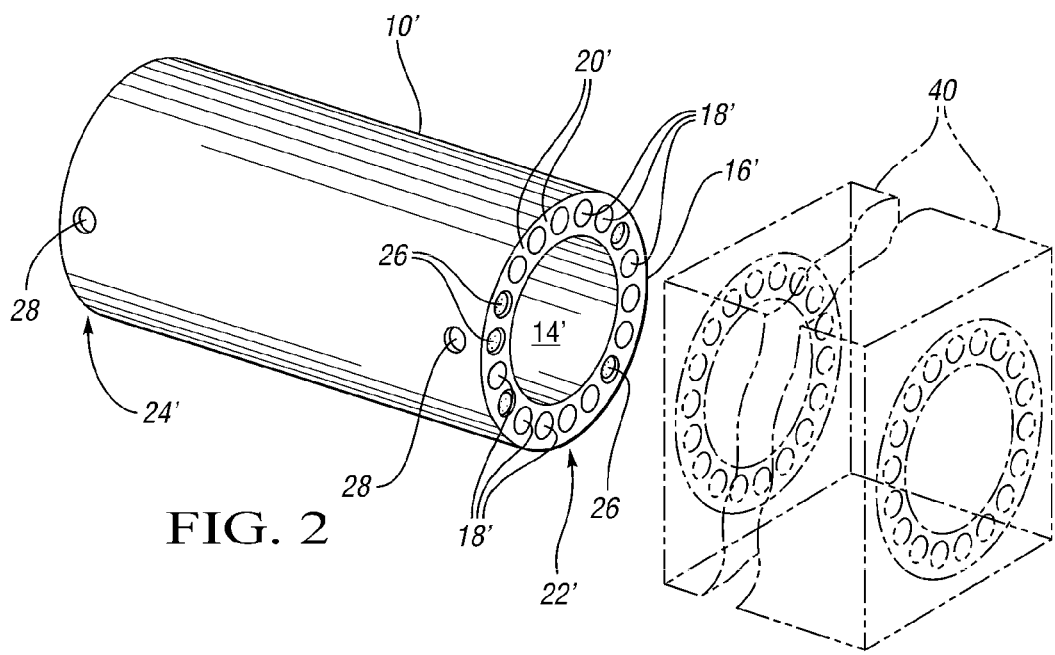
FIG. 2
FIG. 2a

COMPACT OIL TRANSFER MANIFOLD

CROSS-REFERENCE TO RELATED APPLICATION(S)

This application claims is a divisional of U.S. patent application Ser. No. 11/233,849 filed Sep. 23, 2005.

TECHNICAL FIELD

The present invention relates to a manifold that defines a plurality of channels fittable with respect to a transmission shaft and configured to transfer and substantially sustain separation of a plurality of fluid flows and/or pressure signals.

BACKGROUND

In general, manual or automatic vehicle transmissions include a number of devices that require the controlled transference of oil or other hydraulic fluid for operation. A list of such devices includes hydraulically controlled clutch assemblies, planetary carrier gear sets and even electric motors as utilized in electrically variable transmissions. Typically, hydraulic fluid is transferred at a controlled pressure from the transmission sump by a pump or pressure supply line through a labyrinth of transmission shafts, gears and other structural components to the designated area. For example, some front wheel drive transmissions commonly pass another shaft through a center shaft with oil transfer channels. Similarly, in rear-wheel drive transmissions, it is common to pass oil through an input or output shaft. The performance requirements for new transmissions can place greater demands on the structural components of the transmission to adequately support the controlled transference of oil without increasing the packaging space required for the transmission.

SUMMARY

Accordingly, what is needed is a compact oil transfer manifold fittable with respect to the other structural components of the transmission and configured to transfer and substantially sustain separation of a plurality of fluid flows and/or pressure signals. The present invention relates to a manifold fittable with respect to a transmission shaft and operable to simultaneously transfer a plurality of fluids at variable pressures.

The manifold defines a plurality of channels running parallel with respect to the transmission shaft.

In one embodiment, a mechanical seal is fittable in at least one of the plurality of channels so as to substantially prevent the flow of fluid there beyond. The manifold further defines radially extending apertures, intersecting at least one of the plurality of channels, configured to transfer fluid therebetween.

The manifold being fittable with respect to the transmission shaft, may variably be configured to surround the transmission shaft or fit inside the transmission shaft. When the manifold is configured to fit within the transmission shaft it may be affixed thereto with an elastomeric seal.

Moreover, the manifold may be composed of an extruded structural metal.

More specifically, the present invention involves a vehicle transmission with a manifold configured to define a plurality of channels configured to transfer and substantially sustain separation of a plurality of fluid flows and/or pressure signals.

Also included with the present invention is a method of manufacturing a manifold suitable for use in a vehicle transmission. The method includes providing an extrusion tool configured in a manner to form a manifold and extruding structural metal through the extrusion tool to a predetermined length. The extrusion tool defines an outer wall of the manifold and at least one laterally extending channel within the manifold.

This invention is also a shaft for transferring a plurality of fluids or fluid signals in a vehicle transmission which comprises a structural element integrally configured as a manifold of one length having multiple channels of equal length for transferring respective fluids. The configuration of the channels in the structural element is sufficient to facilitate the transfer of fluids longitudinally in a channel and laterally from a channel.

The structural element is formed sufficiently long so as to be subdividable into a plurality of structural subdivisions forming a plurality of manifolds of shorter length than the length of the manifold.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of the compact manifold, shown as an extrusion, with eight channels;

FIG. 2 is a schematic perspective view of the compact manifold, shown as an extrusion, with multiple channels sealed by pressed in balls and radial access apertures;

FIG. 2a is a perspective phantom illustration of an extrusion tool for producing the manifold of FIG. 2;

DETAILED DESCRIPTION

Figure 3:
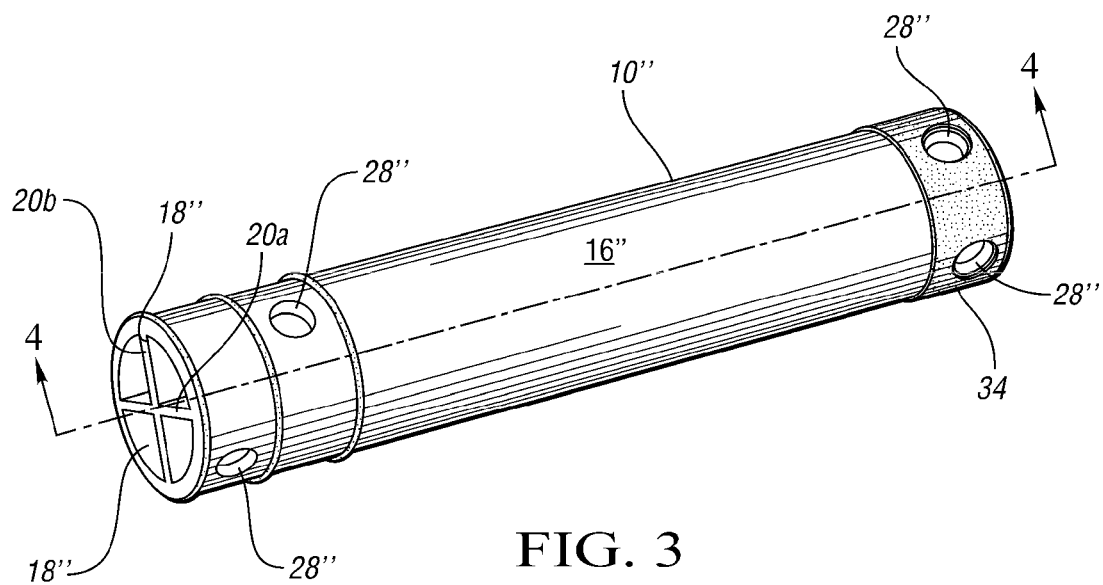
FIG. 3 is a schematic perspective view of the compact manifold illustrating two molded-on sealing techniques.

The present invention may be implemented, by way of example, with a power transmission of the type described in U.S. Pat. No. 5,009,116 to Ordo et al. which is commonly owned with the present application and hereby incorporated by reference in its entirety. Accordingly, the transmission shaft shown in FIG. 1 hereof has been greatly simplified, it being understood that further information regarding the structural components of a transmission may be found in the aforementioned patent.

Referring to the drawings, FIGS. 1 through 4, wherein like characters represent the same or corresponding parts throughout the several views there is shown in FIG. 1 a schematic perspective view of the compact manifold, shown as an extrusion, with eight channels. Fundamentally, the present invention involves a vehicle transmission with a manifold 10 configured to define a plurality of channels 18 configured to transfer and substantially sustain separation of a plurality of fluid flows and/or pressure signals.

More specifically, the present invention relates to manifold 10 fittable around or within the transmission shaft 12 as shown in FIG. 1. The manifold is defined by an inner and outer surface, 14 and 16 respectively. In the preferred embodiment as shown in FIG. 1, the inner surface 14 has a larger radius than the transmission shaft 12 so that the transmission shaft 12 may fit within the manifold 10. The manifold 10 defines a plurality of channels 18 which may extend parallel with respect to the transmission shaft 12. Each channel 18 is defined by the inner and outer surfaces (14, 16) of the manifold 10 as well as the bridges 20 configured to extend between each channel 18. The manifold 10 is configured to support the simultaneous transference of fluid longitudinally in parallel throughout the manifold 10 from the first end 22 to the second end 24 of the manifold 10. The bridges 20 extending between each channel 18 ensure that the fluids passing within the manifold 10 remain substantially separated and may reflect flow at different pressure signals. This application may be suitable for front-wheel drive transmissions, where it is common to pass another shaft through the center of a shaft or housing with oil transfer channels. Similarly, in rear-wheel drive transmissions, it may be necessary to pass oil through an input or output shaft.

Referring to FIG. 2, it may also be desirable to transfer the fluid from the first end 22' to the second end 24' of the manifold 10' without having the fluid pass completely through the manifold 10'. In the embodiment of FIG. 2 a mechanical seal or plug 26 (or interface) is fittable in a desired channel such as 18' to substantially prevent the flow of fluid there beyond. Instead, the fluid may exit through substantially radially extending apertures 28 defined within the outer surface 16' of the manifold 10'. Oil is transferred in and out of the manifold 10' radially (or laterally), through holes drilled or pierced through the outer surface 16' of the manifold 10' and into the channels 18' at the appropriate positions. The substantially radially extending apertures 28 intersect at least one of the plurality of channels 18', which are separated by the bridges 20'. The abbreviated, plugged (or sealed) channels 18' may serve to relieve pressure outside the manifold 10' or support the controlled transfer of fluid therein. Moreover, the radially extending apertures 28 may extend partially through the outer surface 16' of the manifold 10' from the inner surface 14' of the manifold 10' to the channels 18' to support the transference of fluid within the manifold 10'. The plugs or seals 26 are designed to fit the shape of the channels 18'. In FIG. 2, the seals are of the same material as the manifold (e.g., structural aluminum) and formed into a spherical ball so as to fit within the cylindrically shaped channels 18' defined by the manifold 10'. The seals or plugs 26 may be pressed or brazed into the channels 18'. This application may also be suitable for front- and rear-wheel drive transmissions.

Figure 4:
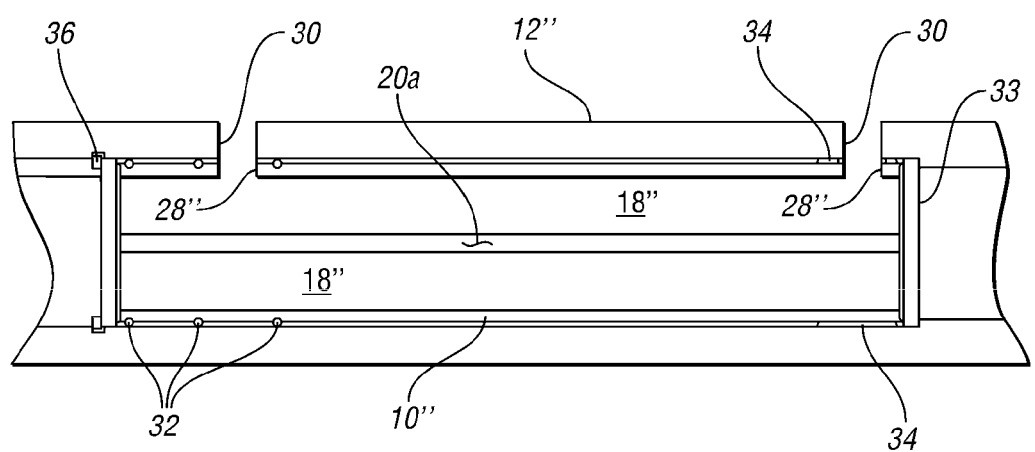
FIG. 4 is a schematic cross-sectional view of the compact manifold of FIG. 3 having seals and held in place with a snap ring.

In another embodiment of the present invention shown in FIG. 3, the channels 18" are defined by the outer surface 16" of the manifold 10" and two intersecting bridges (20a and 20b) which partition the inner cavity of the manifold 10" into quarters. Again, radially extending apertures 28" extend from the outer surface 16" of the manifold 10" to at least one the channels 18" to permit oil to flow radially. The channels 18" may also be sealed as shown in FIG. 2. Additionally the transmission shaft 12", as shown in FIG. 4, may be configured with radially extending apertures 30 which align with the radially extending apertures 28" of the manifold 10" to support the flow of fluid from the inside of the manifold 10" to outside of the transmission shaft 12". This arrangement may be ideal for the input shaft of a rear-wheel-drive transmission.

The manifold 10" may also be configured to fit inside the transmission shaft as shown in FIGS. 3 and 4. When the manifold 10" is configured to fit within the transmission shaft 12" it may be affixed thereto with an elastomeric seal. Since the manifold 10" may be composed of an aluminum alloy and the transmission shaft may be composed of steel, the differences in thermal expansion coefficients may make it unfeasible to seal the interface between the two parts with a simple press-fit. Consequently, any one of a number of seals which may by pressed or brazed closed, such as 33 as shown in FIG. 4, might be used to remedy this. The seals may be elastomeric or they may comprise a material similar to that of the manifold. Additionally, two bonded rubber alternatives as illustrated in FIGS. 3 and 4 may be used. The illustrated embodiment of FIG. 4 utilizes several elastomeric rings 32 thereby requiring more axial space for several oils as well as a wide sleeve 34, which seals around the apertures, allowing several transfers to be made at the same axial position. The manifold 10" may be secured to the shaft 12" with a snap ring 36.

Also included with the present invention is a method of manufacturing a transmission manifold. The method includes providing an extrusion tool 40, as shown in FIG. 2, configured in a manner to form a manifold (10, 10' or 10"). The extrusion tool 40 defines an outer surface 16' of the manifold 10 'and at least one longitudinally extending channel 18' within the manifold 10'. The method further includes extruding the structural metal through the extrusion tool 40 to a predetermined length such as seen in FIG. 1. The extruded blank is then simply cut to a shorter length to form a plurality of manifolds (as demonstrated in portions X and Y, separated by the phantom line of FIG. 1), each having the desired length. To achieve the manifold 10 as shown in FIG. 1, the extrusion tool 40 is configured to further define an inner surface 14 and at least one longitudinally extending channel 18 is defined by at least two bridges 20 as defined by the extrusion tool 40. To achieve the manifold 10' shown in FIG. 2, at least one of the longitudinally extending channels 18' defined by the extrusion tool 40 is cylindrical. Likewise, to achieve the configuration shown in FIGS. 3 and 4, at least one laterally extending channel 18' is defined by at least two intersecting bridges (20a and 20b) as defined by the extrusion tool 40. In the preferred embodiment, the manifold 10 is composed of an extruded structural metal. The manifold 10 may also be composed of a powdered metal formed by a die casting process, among other manufacturing processes known within the art.

The foregoing method results in a shaft for transferring a plurality of fluids or fluid signals in a vehicle transmission which comprises a structural element integrally configured as a manifold of one length having multiple channels of equal length for transferring respective fluids. The configuration of the channels in the structural element is sufficient to facilitate the transfer of fluids longitudinally in a channel and laterally from a channel.

Other materials and processes may be used to form the manifold. Extruded aluminum is a good choice, but steel, bronze or plastics cold be implemented, depending upon the circumstances, and powdered metal sintering or casting are optional processes.

While the best modes for carrying out the invention have been described in detail, those familiar with the art to which this invention relates will recognize various alternative designs and embodiments for practicing the invention within the scope of the appended claims.

The invention claimed is:

1. A method of manufacturing a manifold suitable for use in a vehicle transmission, comprising:
    extruding metal using an extrusion tool configured in a manner to form a manifold having a predetermined length through said extrusion tool to form the manifold;
    wherein said extrusion tool defines an outer wall and an inner wall of the manifold, and at least one longitudinally extending channel within the manifold such that the at least one longitudinally extending channel is configured to sustain and transfer a fluid;
    wherein said at least one longitudinally extending channel is established by at least two bridges as defined by said extrusion tool; and generating a radially extending aperture such that the aperture extends from the outer surface of the manifold to said at least one longitudinally extending channel to transfer fluid therebetween.

2. The method of claim 1, wherein said at least one longitudinally extending channel is cylindrical.

3. The method of claim 1, wherein said at least one longitudinally extending channel is defined by an intersection of at least two bridges as defined by said extrusion tool.

4. The method of claim 1, further comprising cutting the predetermined length to form a plurality of manifolds.

5. The method of claim 1, further comprising sealing said at least one longitudinally extending channel to support the transfer of the fluid therein.

6. The method of claim 1, wherein said sealing said at least one longitudinally extending channel is accomplished via a mechanical seal or plug.

7. The method of claim 1, wherein said generating the radially extending aperture includes extending the aperture through the outer surface from the inner wall of the manifold.

8. A method of manufacturing a manifold suitable for use in a vehicle transmission, comprising:

extruding metal using an extrusion tool configured in a manner to form a manifold having a predetermined length through said extrusion tool to form the manifold;

wherein said extrusion tool defines an outer wall and an inner wall of the manifold, and at least one longitudinally extending channel within the manifold such that the at least one longitudinally extending channel is configured to sustain and transfer a fluid; and wherein said at least one longitudinally extending channel is defined by at least two bridges as defined by said extrusion tool; and generating a radially extending aperture such that the aperture extends from the outer surface of the manifold to said at least one longitudinally extending channel to transfer fluid there between;

wherein said generating the radially extending aperture includes extending the aperture through the outer surface from the inner wall of the manifold.

\* \* \* \* \*